(12) United States Patent
Horikawa et al.

(10) Patent No.: US 6,690,827 B1
(45) Date of Patent: Feb. 10, 2004

(54) APPROXIMATION METHOD OF SHAPE DATA, INFORMATION PROCESSING APPARATUS AND MEDIUM

(75) Inventors: Junji Horikawa, Tokyo (JP); Takashi Totsuka, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/326,841

(22) Filed: Jun. 7, 1999

(30) Foreign Application Priority Data

Jun. 12, 1998 (JP) .......................... P10-164876
May 25, 1999 (JP) .......................... P11-145471

(51) Int. Cl.$^7$ ................................ G06K 9/46
(52) U.S. Cl. ..................... 382/203; 382/199; 345/441
(58) Field of Search ............................. 382/181, 195, 382/199, 203, 241, 266, 269, 275, 118, 190, 197, 242, 243, 215; 345/418, 419, 420, 428, 433, 441, 421, 424, 473, 581, 606

(56) References Cited

U.S. PATENT DOCUMENTS

| | | | |
|---|---|---|---|
| 4,152,766 A | 5/1979 | Osofsky et al. | 364/515 |
| 4,566,126 A * | 1/1986 | Miyagawa et al. | 382/283 |
| 4,600,919 A | 7/1986 | Stern | 340/725 |
| 4,694,407 A | 9/1987 | Ogden | 364/518 |
| 4,783,829 A | 11/1988 | Miyakawa et al. | 382/199 |
| 4,969,204 A | 11/1990 | Melnychuck et al. | 382/240 |
| 5,029,228 A | 7/1991 | Nonoyama et al. | 382/305 |
| 5,040,130 A | 8/1991 | Chang et al. | 364/521 |
| 5,276,786 A | 1/1994 | Long et al. | 395/128 |
| 5,341,466 A | 8/1994 | Perlin et al. | 395/139 |
| 5,373,375 A | 12/1994 | Weldy | 358/523 |
| 5,384,904 A | 1/1995 | Sprague et al. | 395/139 |
| 5,448,686 A | 9/1995 | Borrel et al. | 395/120 |
| 5,490,239 A | 2/1996 | Myers | 395/129 |
| 5,504,847 A * | 4/1996 | Kimura et al. | 345/433 |
| 5,506,947 A | 4/1996 | Taubin | 395/133 |
| 5,590,248 A | 12/1996 | Zarge et al. | 395/121 |
| 5,613,051 A | 3/1997 | Iodice et al. | 395/128 |
| 5,615,317 A | 3/1997 | Freitag | 395/119 |
| 5,621,827 A | 4/1997 | Uchiyama et al. | 382/307 |
| 5,689,577 A | 11/1997 | Arata | 382/128 |
| 5,754,182 A * | 5/1998 | Kobayashi | 345/423 |
| 5,761,332 A | 6/1998 | Wischmann et al. | 382/131 |
| 5,774,130 A | 6/1998 | Horikawa et al. | 345/441 |
| 5,796,400 A | 8/1998 | Atkinson et al. | 345/420 |
| 5,963,209 A * | 10/1999 | Hoppe | 345/419 |
| 5,995,663 A * | 11/1999 | Itsuzaki et al. | 382/203 |

OTHER PUBLICATIONS

O'Connell Object–Adaptive Vertex–Based Shape Coding Method, IEEE, pp. 251–255, Feb., 1997.*

U.S. patent application Ser. No. 09/755,129, filed Nov. 25, 1996.

U.S. patent application Ser. No. 08/959,247, filed Oct. 28, 1997.

U.S. patent application Ser. No. 08/987,004, filed Dec. 8, 1997.

(List continued on next page.)

*Primary Examiner*—Daniel G. Mariam
(74) *Attorney, Agent, or Firm*—Bell, Boyd & Lloyd LLC

(57) ABSTRACT

An shape data approximation method for reducing the amount of data with an adjacency relationship between a plurality of components maintained. The shape data is read, an adjacent region of the shape data is designated, a virtual surface and a virtual edge are created in the designated adjacent region, and each edge in the shape data is evaluated to determine a evaluation score. The evaluation score is based on a change in the shape of the adjacent region on the assumption that the virtual edge is removed. The edges are subjected to data sorting, and an edge having a low evaluation score is removed with high priority, and resulting approximate shape data is thus output.

54 Claims, 14 Drawing Sheets

OTHER PUBLICATIONS

M. Garland et al., "Surface Simplification Using Quadric Error Metrics," Computer Graphics Proceedings, Annual Conference Series, Aug. 3–8, 1997, pp. 209–216.

F. Schmitt et al., "An Adaptive Subdivision Method for Surface–Pitting from Sampled Data," Computer Graphics Proceedings, Annual Conference, vol. 20., No. 4, Aug. 18–22, 1986, pp. 179–188.

H. Hoppe et al., "Mesh Optimization," Computer Graphics Proceedings, Annual Conference Series, Aug. 1–6, 1993, pp. 19–26.

G. Turk, "Re–Tiling Polygonal Surfaces," Computer Graphics Proceedings, Annual Conference Series, Jul. 26–31, 1992, pp. 55–64.

* cited by examiner

APPROXIMATION METHOD OF SHAPE DATA, INFORMATION PROCESSING APPARATUS AND MEDIUM

BACKGROUND OF THE INVENTION

1. Field of the Invention

The present invention relates to a shape data approximation method for reducing the amount of data address of a shape model used in the field of computer graphics, in which the shape model is approximated with its general shape maintained. The present invention also relates to an information processing apparatus that executes the approximation method and a medium that provides a program for the approximation method.

2. Description of the Related Art

When a plurality of identical models are present on screen in the image rendering in the computer graphics, the same model is typically rendered regardless of the location, size, and depth of the model, a point of interest to a viewer, and speed of the movement of the model. Such shape model is called a polygon model, and is constructed of a plurality of surfaces.

The same model is not always required in the rendering. Models are switched depending on the location, size, depth of the model, a point of interest to a viewer, and the speed of the model. Not only an original detailed model, but also a more simplified model is rendered at a sufficiently high image quality.

Specifically, a graphics display apparatus has prepared models at different levels of detail, and switch them from one to another during the rendering, presenting an apparent image quality as good as that provided by the original model. Since the rendering time in the computer graphics depends on the amount of data, a model having a smaller amount of data is rendered faster than the original model. Such an arrangement satisfies two requirements at the same time, a high-speed rendering and a high-image quality rendering, normally required of computer graphics.

Techniques for creating models having different levels of detail are effective for the display of computer graphics models. If the amount of data is simply reduced to lower the level of detail of the model, the viewer may find an approximate model unnatural. To minimize the unnatural look, a general feature portion of the model is preferably left while the remaining portion is cut to reduce the amount of data. Such an approximation of the model is hitherto manually performed by designers, requiring a great deal of labor and time.

Reducing the amount of data (the number of polygons and the number of surfaces) is called a polygon reduction, a polygonal approximation, a polygon compression, or a surface simplification.

Several studies for performing the polygonal approximation, namely, surface simplification on a computer have been made. These studies treat an approximation method for a single component only, and fail to consider an approximation that maintain a positional relationship and engagement relationship between a plurality of associated components.

If the engagement relationship is destroyed in rendering components, such as gears in mesh or a top covering and a bottom covering, having an engagement relationship, the destroyed engagement relationship not only presents an unnaturally looking image to the viewer but also makes it impossible to render a plurality of components together on screen.

In a paper authored by Greg Turk, entitled "Re-Tiling Polygonal Surface" (Computer Graphics, Vol. 26, No. 2, Jul. 1992), points, arranged on the surface of a polygon model, are connected to reorganize the model, and the model is thus hierarchically approximated. The algorithm presented by this paper treats a rounded object, but is inappropriate for a sharp edged shape, and is unable to cover objects of general shapes.

In a paper authored by Francis J. M. Schmitt, Brian A. Barsky, and Wen-Hui Du, entitled "An Adaptive Subdivision Method for Surface-Fitting from Sampled Data" (Computer Graphics Vol. 20, No. 4, Aug. 1986), Bezier patches are attached to a three-dimensional object for approximation. According to this paper, however, general polygons typically used in the computer graphics are not treated.

In a paper authored by Hugues Hoppe et al., entitled "Mesh Optimization" (Computer Graphics Proceedings, Annual Conference. Series, SIGGRAPH 1993), energy is introduced in the evaluation of a approximation model. In order to the minimize the energy, an edge removal, a patch segmentation, and an edge swapping are iterated to approximate the model. In the technique disclosed in this paper, long iterative calculations are required before a minimum energy point is found. For the point not to be trapped in a localized minimum point, some solution, such as simulated annealing, is required like other minimum energy problems. The minimum energy point is not necessarily the best in terms of the sense of vision.

In a paper authored by Hugues Hoppe, entitled "Viewed Dependent Refinement of Progressive Meshes" (Siggraph 97 Conference Proceedings 1997), the energy of an edge is calculated, and an edge having a small energy value is removed. Furthermore, a polygon reduction is performed in accordance with a viewer's point of view. However, an adjacency relationship between components is not considered. Michael Garland and Paul S. Heckbert disclose a polygon reduction technique in a paper entitled "Surface Simplification Using Quadric Error Metrics" (Siggraph 97 Conference Proceedings 1997). A distance from an apex to a surface is squared, squared distances are summed, and an edge having a smaller sum has a higher priority in removal. In this case also, the adjacency and engagement relationships between components are not considered.

These past studies of the approximation of the model fail to treat the adjacency relationship and engagement relationship.

In the conventional shape approximation, the objects to be handled are limited, a long calculation time is required, and the adjacency relationship striding over a plurality of components is not considered.

SUMMARY OF THE INVENTION

Accordingly, it is an object of the present invention to provide a shape data approximation method which approximates shape data while maintaining an adjacency relationship and engagement relationship in an adjacent region where a plurality of components are adjacent to each other, in the approximation of a shape model used in the computer graphics. It is also an object to provide an information processing apparatus that executes the approximation method and a medium that provides a program for the approximation method.

In one aspect of the present invention, the approximation method for approximating shape data at a desired level of detail to be approximate data, includes the designating step of designating an adjacent region where a plurality of components are adjacent to each other in the shape data, the evaluating step of calculating an evaluation score in accordance with the degree of deformation of the adjacent region resulting from an approximation, and the approximating step of approximating the shape data in accordance with the evaluation score to create the approximate data.

In another aspect of the present invention, the approximation method for approximating shape data at a desired level of detail to be approximate data, includes the forming step of placing a virtual edge between apexes of an adjacent region where a plurality of components are adjacent to each other in the shape data, the selecting step of selecting an evaluation edge of interest for evaluation from edges constituting the shape data and the virtual edge, the evaluating step of calculating an evaluation score in accordance with the degree of importance of the evaluation edge in response to a removal of the evaluation edge, and the approximating step of approximating the shape data in accordance with the evaluation score.

In yet another aspect of the present invention, the An information processing apparatus for approximating shape data at a desired level of detail to be approximate data, includes designating means for designating an adjacent region where a plurality of components are adjacent to each other in the shape data, evaluating means for calculating an evaluation score in accordance with the degree of deformation of the adjacent region resulting from an approximation, and approximating means for approximating the shape data in accordance with the evaluation score provided by the evaluating means to create the approximate data.

In yet another aspect of the present invention, the information processing apparatus for approximating shape data at a desired level of detail to be approximate data, includes forming means for placing a virtual edge between apexes of an adjacent region where a plurality of components are adjacent to each other in the shape data, selecting means for selecting an evaluation edge of interest for evaluation from edges constituting the shape data and the virtual edge, evaluating means for calculating an evaluation score in accordance with the degree of importance of the evaluation edge in response to a removal of the evaluation edge, and approximating means for approximating the shape data in accordance with the evaluation score.

In yet another aspect of the present invention, the information processing apparatus for approximating shape data at a desired level of detail to be approximate data, includes a storage unit for storing a program including process steps and a control circuit for executing the program in accordance with the process steps, wherein the program includes the steps of designating an adjacent region where a plurality of components are adjacent to each other in the shape data, calculating an evaluation score in accordance with the degree of deformation of the adjacent region resulting from an approximation, and approximating the shape data in accordance with the evaluation score provided by the calculating means to create the approximate data.

In yet another aspect of the present invention, the information processing apparatus for approximating shape data at a desired level of detail to be approximate data, includes a storage unit for storing a program including process steps and a control circuit for executing the program in accordance with the process steps, wherein the program includes the steps of placing a virtual edge between apexes of an adjacent region where a plurality of components are adjacent to each other in the shape data, selecting an evaluation edge of interest for evaluation from an edge constituting the shape data and the virtual edge, calculating an evaluation score in accordance with the degree of importance of the evaluation edge in response to a removal of the evaluation edge, and approximating the shape data in accordance with the evaluation score.

In yet another aspect of the present invention, the medium provides a program to be executed by an information processing apparatus. The program includes the steps of
designating an adjacent region where a plurality of components are adjacent to each other in the shape data, calculating an evaluation score in accordance with the degree of deformation of the adjacent region resulting from an approximation, and approximating the shape data in accordance with the evaluation score to create the approximate data.

In yet another aspect of the present invention, the medium for providing a program to be executed by an information processing apparatus. The program includes the steps of placing a virtual edge between apexes of an adjacent region where a plurality of components are adjacent to each other in the shape data, selecting an evaluation edge of interest for evaluation from an edge constituting the shape data and the virtual edge, and calculating an evaluation score in accordance with the degree of importance of the evaluation edge in response to a removal of the evaluation edge, and approximating the shape data in accordance with the evaluation score.

In yet another aspect of the present invention, the medium provides approximate data into which shape data is approximated at a desired level of detail. The approximate data is processed in accordance with the process that includes the steps of designating an adjacent region where a plurality of components are adjacent to each other in the shape data, calculating an evaluation in accordance with the degree of deformation of the adjacent region resulting from an approximation, and approximating the shape data in accordance with the evaluation score provided through the calculating step to create the approximate data.

In yet another aspect of the present invention, the medium provides approximate data into which shape data is approximated at a desired level of detail. The approximate data is processed in accordance with the process that includes the steps of placing a virtual edge between apexes of an adjacent region where a plurality of components are adjacent to each other in the shape data, selecting an evaluation edge of interest for evaluation from an edge constituting the shape data and the virtual edge, calculating an evaluation score in accordance with the degree of importance of the evaluation edge in response to a removal of the evaluation edge, and approximating the shape data in accordance with the evaluation score.

Another aspect of the present invention is the computer program under which an information processing apparatus creates approximate data by approximating shape data at a desired level of detail. The program includes the steps of designating an adjacent region where a plurality of components are adjacent to each other in the shape data, calculating an evaluation score in accordance with the degree of deformation of the adjacent region resulting from an approximation, and approximating the shape data in accordance with the evaluation score to create the approximate data.

Another aspect of the present invention is the computer program under which an information processing apparatus creates approximate data by approximating shape data at a desired level of detail. The program includes the steps of placing a virtual edge between apexes of an adjacent region where a plurality of components are adjacent to each other in the shape data, selecting an evaluation edge of interest for evaluation from an edge constituting the shape data and the virtual edge, calculating an evaluation score in accordance with the degree of importance of the evaluation edge in response to a removal of the evaluation edge, and approximating the shape data in accordance with the evaluation score.

DESCRIPTION OF THE PREFERRED EMBODIMENTS

Figure 1:
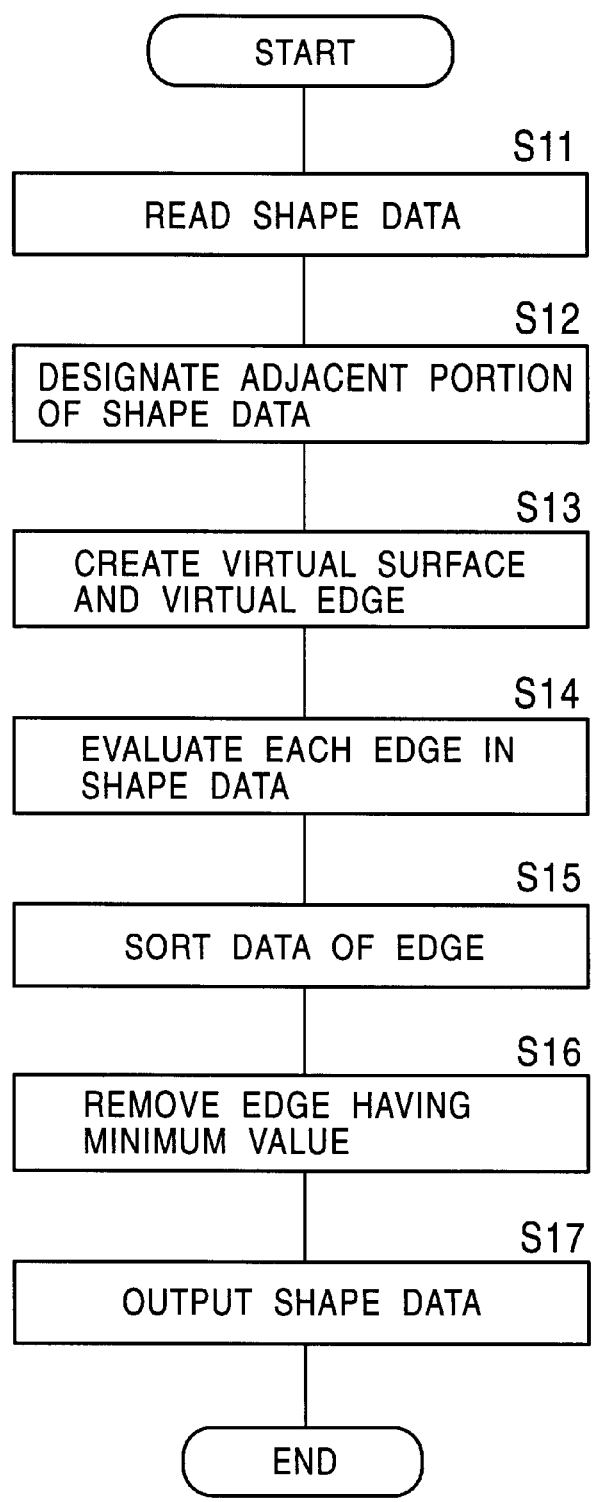
FIG. 1 is a flow diagram illustrating one embodiment of a shape data approximation method of the present invention.

Referring to the drawings, the embodiments of the present invention are now discussed.

FIG. 1 is a flow diagram showing a shape data approximation method of one embodiment of the present invention.

Referring to FIG. 1, shape data is read in step S11. The shape data is newly created or already created data is read. In step S12, an adjacent region of the shape data is designated. The adjacent region is where a plurality of components are adjacent to each other or in mesh with each other. The adjacent region designating step will be discussed in more detail later. In step S13, a virtual surface and a virtual edge are formed in the adjacent region. In this step, the virtual surface and the virtual edge are set up in the adjacent region designated in step S12, as if they were present, though not actually present. In step S14, each edge of the shape data, namely, each edge constituting the shape data, is evaluated. In step S15, the data of the edges is sorted in accordance with the evaluation score obtained in step S14. The sorting step determines the order according to the magnitude of the evaluation score of each edge. The smaller the evaluation score, the lower the degree of importance of the edge, and it is important to find an edge having a minimum evaluation value. In one sorting method, all edges are quickly sorted using a quick sort technique subsequent to the calculation of the evaluation of all edges. In another sorting method, the evaluation value of each edge is calculated and each edge is sorted using a heap sort technique. The quick sort and the heap sort are well known in the art, and are not discussed here. In step S16, an edge having a minimum value is removed, and in step S17, the shape data that is reorganized subsequent to the edge removal is output.

Although such a field data approximation method is carried in software using a computer, each step may be implemented in corresponding hardware functional block. For example, the construction of a graphics display apparatus for approximating the shape data at a desired level of detail roughly includes adjacent region designating means for designating an adjacent region where a plurality of components are adjacent to each other in the shape data, evaluating means for calculating an evaluation score in accordance with the degree of importance of the designated adjacent region, and approximating means for approximating the shape data in accordance with the evaluation score provided by the evaluating means.

The designating of the adjacent region of the shape data in step S12 and the evaluation of each edge in the shape data in step S14 are now discussed in detail.

Figure 2:
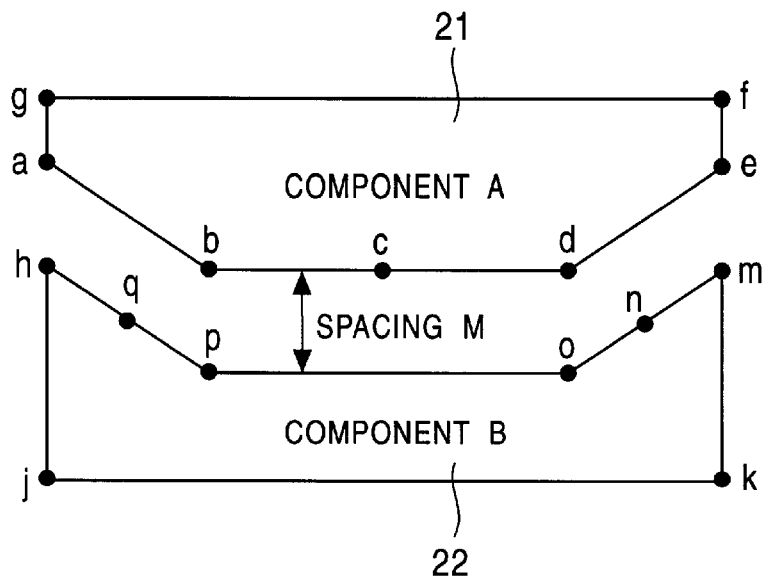
FIG. 2 shows an adjacent region formed of a plurality of components.

The adjacent region of the shape data refers to a portion where two or more components, 21 and 22, are adjacent to each other with a certain spacing therebetween, as shown in FIG. 2. The spacing is sometimes wide, and other times narrow with both components almost in contact with each other, or there are times when both components are really in contact with each other. Referring to FIG. 2, a component A(21) and a component B(22) are adjacent to each with a spacing M kept therebetween. This form of adjacency includes an engagement state of gears.

A user designates a region where a plurality of segments are adjacent to each other in the shape data. Referring to FIG. 2, a segment formed of apex a through apex e, namely, a segment a-b-c-d-e of the component A(21) and a segment formed of apex h through apex m, namely, a segment h-q-p-n-m are adjacent to each other with a spacing M therebetween. To designate the adjacent region, their apex numbers or apex symbols are designated. In other designating methods, a component, a surface, an edge, or an apex may be designated with a name or a number. Any method is acceptable as long as it identifies which segment of the shape data is designated. In typically available application softwares, a segment may be easily designated by a mouse or a digitizer.

When the user designates the adjacent region, which segment of the shape data is adjacent to or in mesh with another segment is known. In this embodiment, a virtual edge and a virtual surface are created on the adjacent segments.

Figure 3:
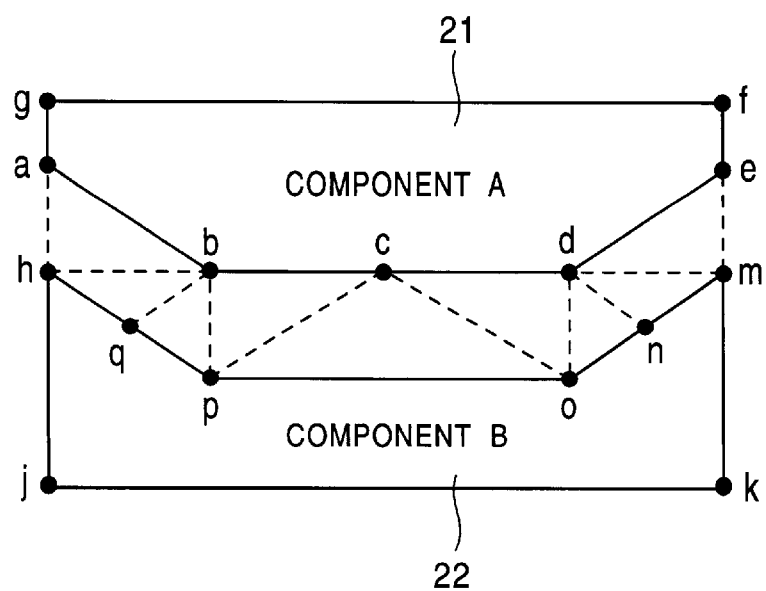
FIG. 3 is an explanatory diagram showing a virtual edge and a virtual surface extended in the adjacent region.

The virtual surface and the virtual edge are created, as if they were present, though actually not present on that portion. The terms the virtual surface and the virtual edge are here used to represent such edges and surfaces. FIG. 3 shows the virtual surface and the virtual edge, extended between the adjacent segments shown in FIG. 2. Referring to FIG. 3, dotted edges are virtual edges that are not really present. The user may create each virtual edge by connecting apexes between the designated components. Among surfaces containing virtual edges, a triangle ahb, for example, is a space present between the component A and the component B, and is a virtual triangle with nothing really present there. Although the triangle has really no area on it, its area is easily calculated on the assumption that the triangle ahb is present there. The resulting area is treated as the area of the virtual surface.

The evaluation of each edge constituting the shape model is now discussed. The approximation of the shape model is performed by iteratively removing an edge constituting the model. When one edge is removed, the surface containing the edge is also removed. The reduction of the surface leads to the reduction of the amount of data of the shape model data.

If an edge is indiscriminately removed, the shape of the shape data is greatly deformed. When the amount of data is reduced, features of the shape of the shape data and the general shape of the shape data need to be maintained. To this end, each edge constituting the shape data model is evaluated, and based on the resulting evaluation score, an edge having a minimum evaluation score is removed with a high priority.

The degree of importance of the adjacent region may be determined from the quantity of deformation in the shape of the adjacent region on the assumption that a virtual edge imaginarily extended between apexes of adjacent segments has been removed. A change in the height of the triangle, when the virtual edge of the virtual surface imaginarily extended between the adjacent segments is removed, is computed in a rate of change between the heights before and after the removal, or in an absolute value, and may be used as determination criteria. To determine the importance of the adjacent region, the degrees of importance of all edges of the entire shape model including the virtual edges are computed, and edges having relatively large values are not removed. The virtual edges themselves are excluded in the determination of the degree of importance of the edges of the entire shape model, and are not removed either.

Figure 4:
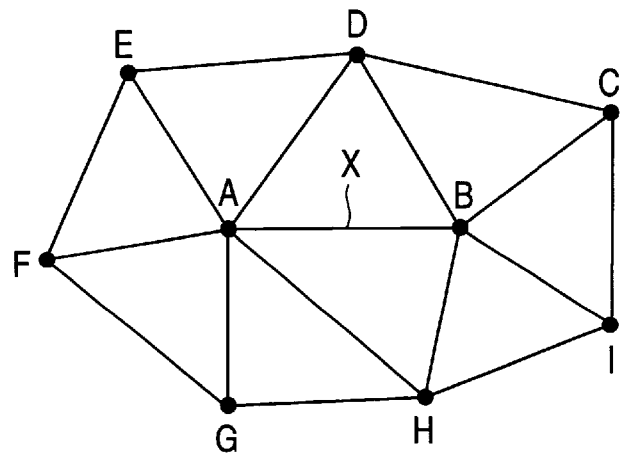
FIG. 4 shows the structure of shape data when the edge is evaluated.

Referring to FIG. 4, there is shown shape data composed of a plurality of apexes. Among them, an edge X constructed of apexes A-B is now evaluated. The evaluation function is expressed by Equation (1).

$$F(X)=V(X)+S(X)+C(X)+H(X) \quad (1)$$

Focusing on the edge X, its evaluation score F(X) from the evaluation function F is determined by summing a change in volume V(X), a change in area S(X), a change in area of contour C(X), and a change in height of the adjacent region H(X). Alternatively, the evaluation score is determined by summing at least one of the change in volume V(X), the change in area S(X), the change in area of contour C(X), and the change in height of the adjacent region.

The change in volume V(X) is now discussed. The change in volume V(X) is expressed by Equation (2).

$$V(x) = \alpha \sum_i (Ni \cdot X) Ai \quad (2)$$

Here, X is a vector X of an edge AB to be evaluated as shown in FIG. 4. Ai represents the area of each surface which contains at least one of apex A and apex B, and Ni represents a line normal to respective surface. The evaluation function is the product of the area Ai and the inner product of Ni and X. This represents the change in volume, namely, a removed volume, when the edge AB is removed. There are a plurality of surfaces that contain either apex A or apex B, and all of them are factored in the evaluation using Σ. The range of i of Σ covers all surfaces which contain at least one of the two apexes constituting the edge being evaluated. Represented by α is a weighted coefficient that indicates the degree of influence of the change in volume over the evaluation score F(X).

The change in area is intended to compensate for the insufficiency of the change in volume. The above-referenced change in volume V(X) fails to reflect, in the evaluation equation, the effect of the surfaces on both sides of the edge being evaluated in response to the removal of the edge. This is because the line normal to the surface also makes a right angle to the edge, making the inner product zero. In a meshed model having a flat surface, there are no irregularities, and the change in volume V(X) becomes zero in the edge evaluation function F(X). The surfaces on both sides of the edge being evaluated are factored in the calculation to determine the change in area. Equation (3) is the evaluation function to this end.

$$S(X) = \beta \sum_j (Sj \times L) \quad (3)$$

In Equation (3), Sj represents the area of surfaces that contain the apexes A and B of the evaluation edge AB as shown in FIG. 4. Referring to FIG. 4, the area here is the area of two surfaces on both sides of the edge AB. Here, L represents the length of the edge AB and β represents a coefficient. To make the dimension of S(X) agree with the change in volume, the change in area is multiplied by the edge length. SixL is calculated for all surfaces containing the apexes A and B, and they are summed using Σ. The range of i of Σ covers all surfaces that contain the two apexes constituting the evaluation edge. Represented by β is the weighted coefficient that indicates the degree of influence of the change in area over the evaluation score F(X). The significance of the inclusion of the change in area S(X) into the evaluation equation is that a surface having a short edge or small area is removed with high priority in a mesh-structured model having less irregularities.

The change in the area of the contour C(X) is now discussed. Although each edge of the model is evaluated by V(X) and S(X), there are times when the two changes alone are not sufficient.

Figure 5:
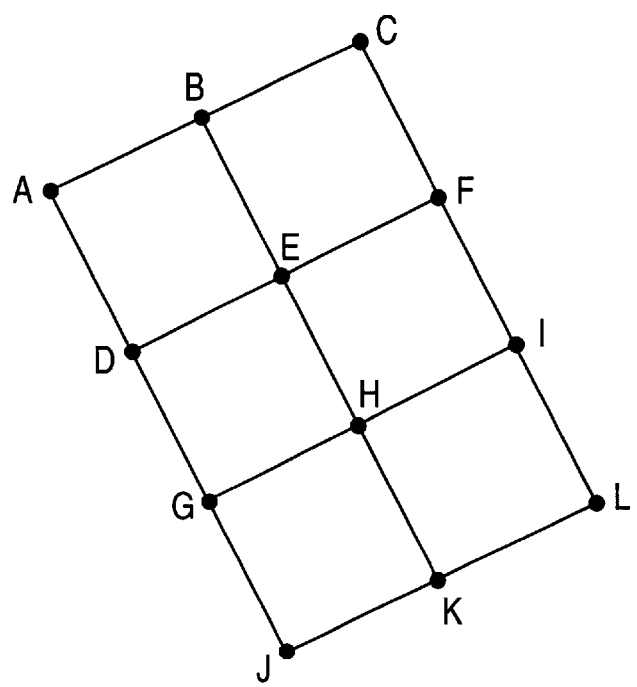
FIG. 5 shows the shape data having a contour line.

FIG. 5 shows such an example. Referring to FIG. 5, there is shown a mesh shape model. The sum of V(X) and S(X) of an edge AD is smaller than that of an edge BE. This is because the number of surfaces present on both sides of the edge AD is smaller and the number of surfaces containing the apexes constituting the edge AD is also smaller. Even in the surfaces having the same shape, the evaluation score of each edge becomes different. For the same reason, the evaluation score of the edge AD is smaller than that of the edge DG.

The removal of the edge AD means the removal of the contour line of the surface. If an apex, subsequent to the removal, is placed on a center point of the edge AD, the influence of the edge removal is significant on the shape data. The above change in the shape is precluded, not only by taking into consideration the number of apexes connected to the apexes of the edge but also by factoring the change in the contour line (corresponding to the outline of the model) of the shape data into the evaluation score.

The contour line at the outline of the shape data has been discussed. The above principle is true not only in the contour line but also the adjacent region between different surfaces. Specifically, a border region is maintained using C(X) where materials change or the construction of surface changes, for example, in color, texture, and material.

Figure 6:
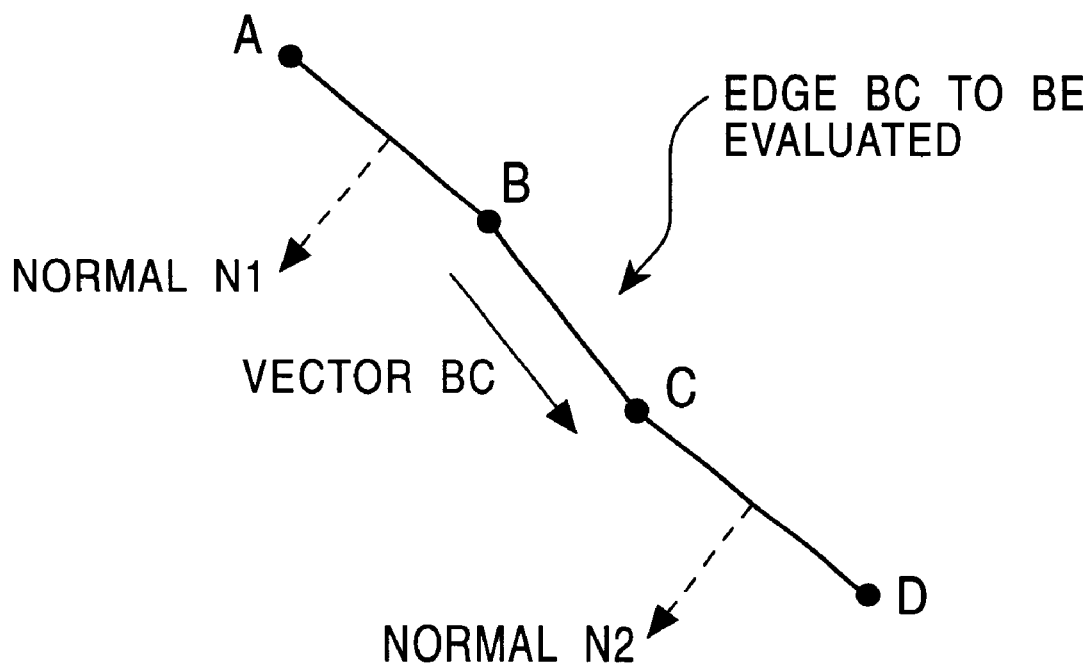
FIG. 6 is an explanatory diagram showing an evaluation equation of the edge.

C(X) is expressed by Equation (4), and FIG. 6 explains Equation (4).

$$C(X) = \Upsilon \left( \sum_k (Nk \cdot X) Lk \right)^{3/2} \quad (4)$$

In Equation (4), Nk is a normal vector normal to an edge extending to two apexes constituting an evaluation edge, Lk is the length of the edge extending to the two apexes, and E is a vector of the evaluation edge. The range of k of Σ cover all edges that contain one of the apexes constituting the evaluation edge and form a contour line. Referring to FIG. 6, the edge BC is now evaluated. The edge AB connects to the apex B, forming the contour line, and the edge CD connects to the apex C, forming the contour line. Here, the vector BC is the vector X, and normal lines N1 and N2 at the edges AB and BC are Nk in Equation (4). Equation (4) means that the change in the area of the contour is subjected to the square root operation and then cubed to match the dimension of volume. Like other equations, y is a weighted coefficient, and makes adjustment to be balanced with other values in the evaluation score F(X).

The change in height H(X) is now discussed. The change in height H(X) is the core equation in this embodiment. In a strict sense, the change values V(X), S(X), and C(X) do not reflect the adjacency relationship and engagement relationship straddling a plurality of components. Occasionally, however, the adjacent region may be factored in the calculation because the edge imaginarily extended in the range of Σ is included when the change in volume V(X) is calculated. The change in height is a unique additional component which is calculated to maintain the adjacency relationship in the same shape as the one prior to the reduction.

Figure 7A:
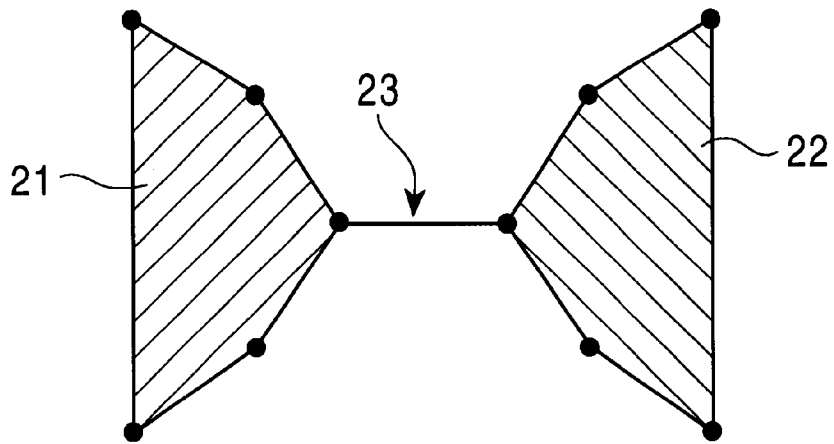
FIGS. 7A and 7B show an adjacent region formed by a plurality of components.
Figure 7B:
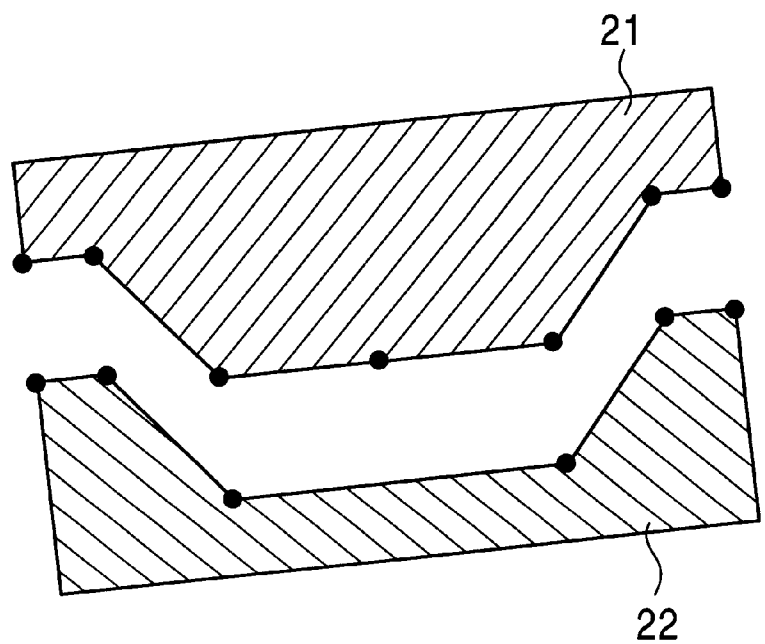

FIGS. 7A and 7B show the adjacency relationship between two components. FIG. 7A shows the adjacency relationship between the component A and the component B in cross section. Virtual surfaces and virtual edges 23 are extended in the adjacent region. FIG. 7B shows the same components shown in FIG. 7A, in a different angle.

Figure 8:
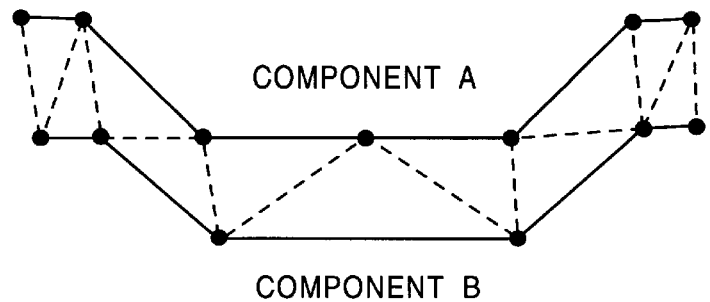
FIG. 8 is an explanatory diagram showing a virtual surface and a virtual edge extending over the adjacent region.

Referring to FIG. 8, there are shown the virtual surfaces and the virtual edges, in dotted line, extended in the adjacent region as shown in FIGS. 7A and 7B. The adjacent region is identified when it is designated by the user. The adjacent region may be designated by the number or position of an apex, and the number or position of an edge. It is not necessary to directly designate it. Alternatively, a file having this sort of information may be read.

When the adjacent region, or the positional relationship between components such as an engagement state, is designated as described above, the virtual surfaces and virtual edges are extended. For example, the virtual edge is extended as shown in FIG. 9.

Figure 9:
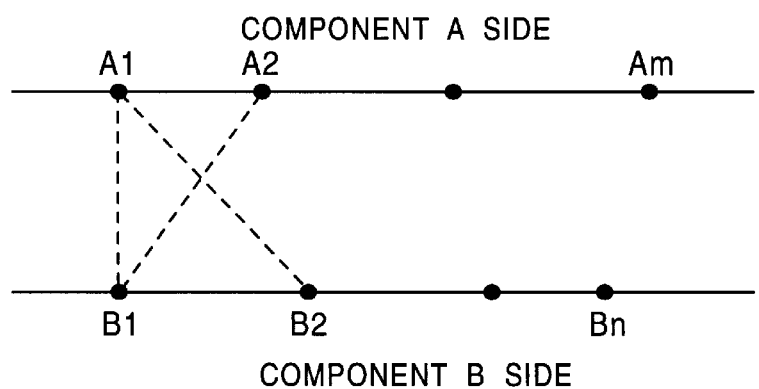
FIG. 9 shows the procedure of extending the virtual edge and the virtual surface.
Figure 10:
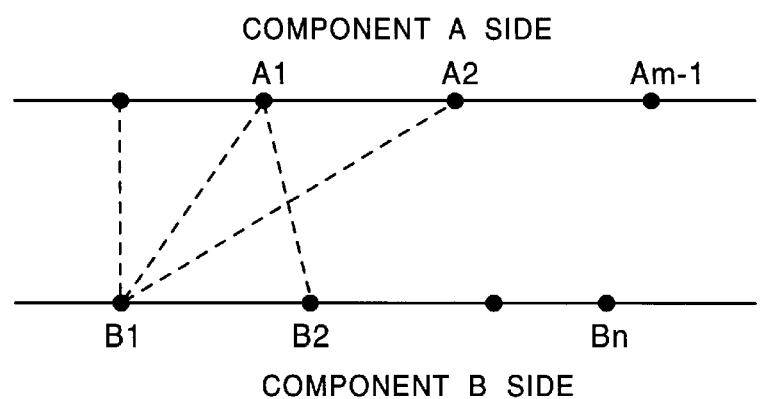
FIG. 10 shows the procedure of extending the virtual edge and the virtual surface.

Referring to FIG. 9, there are shown the component A and the component B. In the adjacent region, a series of apexes A1–Am are designated on the component A and a series of apexes B1–Bm are designated on the component B. Now, a line segment connects A1 to B1, and the length of line segments A1–A2–B1 and the length of line segments B1–B2–A1 are compared, and a shorter one is selected to create virtual edges. The corresponding virtual surface is created at the same time. Since the length of A1–A2–B1 is shorter than the length of B1–B2–A1 in FIG. 9, A2 is selected, and A2–B1 thus forms a virtual edge, and the virtual surface (A1–A2–B1) is thus created. In succession, the point of interest goes by one apex on the side of the virtual edge, either the A2 side or the B2 side. In the example shown in FIG. 9, A1 and A2 are shifted forward by one apex as shown in FIG. 10. As already discussed, the length of A1–A2–B1 and the length of B1–B2–A1 are compared, and a virtual edge is created on the apex having the shorter line side. The operation is repeated to create virtual edges and virtual surfaces until the end of the adjacent region.

If any of the virtual surfaces thus constructed contains at least one of the apexes constituting the evaluation edge, that virtual surface is included in the calculation when the change in volume V(X) is calculated as already described. In this way, the evaluation score of the change in volume increases, and as a result, the degree of importance of the adjacent region increases, and the adjacent region tends to remain in the approximation of the shape. The change in height of the virtual surface is also calculated. The height of the virtual surface in the spacing of the adjacent region is calculated, and the change is calculated when the virtual surface changes in response to the edge removal.

Figure 11A:
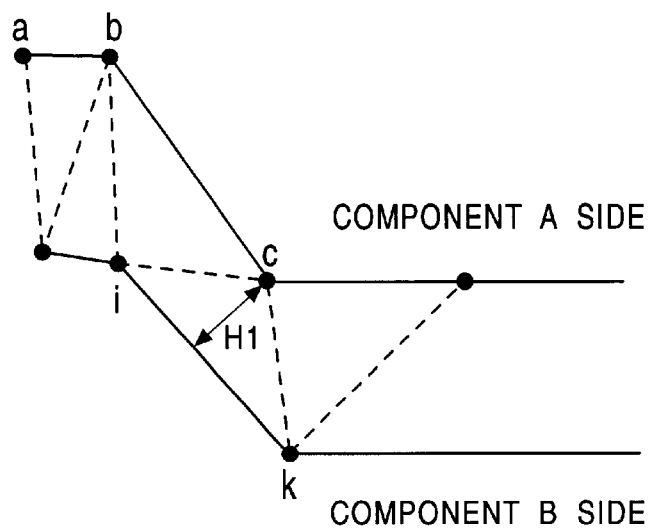
FIGS. 11A and 11B shows a change in the height of the virtual surface.
Figure 11B:
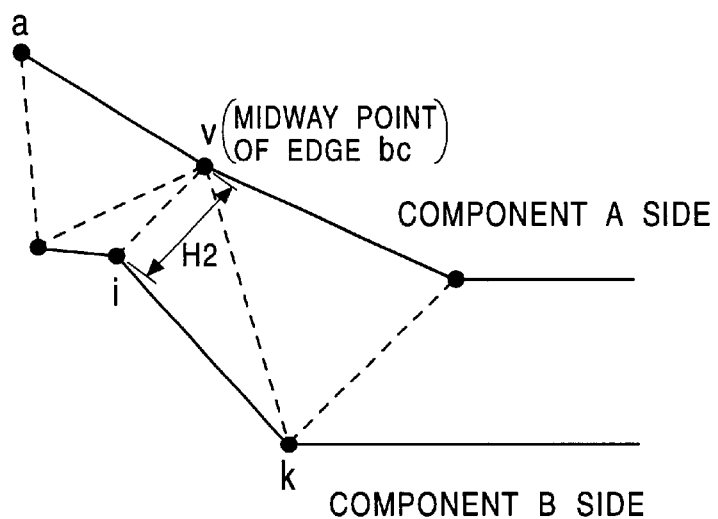

Referring to FIGS. 11A and 11B, the height of the virtual surface is discussed. As shown in FIG. 11A, a component A and a component B are in an adjacency relationship, and an edge bc is now removed. Removing the edge bc means that the apex b and the apex c approach to each other until they merge into one. Let that apex represent v at the center point of the edge bc as shown in FIG. 11B. Referring to FIG. 11B, the new apex v is placed at the center point of the edge bc after the edge bc is removed. The apex v is placed at the center of the edge here. Alternatively, the new apex may be placed closer to one apex than to the other or placed between the apexes b and c in accordance to the ratio of evaluation scores of the apexes b and c.

Focusing the heights of the virtual surface before and after the removal of the edge bc, the height $H_1$ of a triangle ikc shown in FIG. 11A becomes the height $H_2$ of a triangle ikv as shown in FIG. 11B as the apex c changes to the apex v. In this case, the height H of the virtual surface greatly changes. If the height of virtual surface greatly changes in the adjacent region or engagement region in this way, it is difficult to maintain the adjacency relationship and the engagement state. In order to maintain the adjacency relationship between the components, the change in the height H of the virtual surface must be kept to a small range.

The change in the height of the virtual surface is now calculated in connection with the edge constituting the virtual surface. The equation for this calculation is represented by H(X) in Equation (1). The changes in the heights of all virtual surfaces in the adjacent region are calculated and summed using Σ, and the sum is multiplied by a weighted coefficient that represents the influence of the change in the height of the virtual surface on the evaluation score F(X). The following equation (5) thus results.

$$H(X) = \omega \sum_m |H_1 m - H_2 m| \quad (5)$$

where $H_1 m$ is the height of the virtual surface prior to the edge removal, and $H_2 m$ is the height of the virtual surface subsequent to the edge removal. The range of m of $\Sigma$ covers all surfaces that contain at least one of the two apexes constituting the edge currently being evaluated. The value of Equation (5) is thus determined based on the change in the height H of the virtual surface that is formed using the newly created apex. The surfaces containing the evaluation edge are excluded from the range of m because they are eliminated subsequent to the edge removal. The coefficient $\omega$ is a weighted coefficient that represents the influence of the change in the height of the virtual surface on the evaluation score F(X). The change in the height of the virtual surface H(X) is calculated in an absolute value. Alternatively, the change in the height of the virtual surface may be a rate of change in the height as expressed by Equation (6) to preclude the effect of dynamic range in the data of apex positions in the model.

$$H(X) = \omega \sum_m \left( \frac{|H_1 m - H_2 m|}{H_1 m} \right) \quad (6)$$

The change in the height of the virtual surface may be cubed as expressed by Equation (7) to make its dimension agree with that of F(X).

$$H(X) = \omega \sum_m |H_1 m - H_2 m|^3 \quad (7)$$

When the edge removal moves the apex constituting the border between the component A or the component B and the virtual surface, the shape of the virtual surface changes, in other words, the evaluation by one of Equation (5) through Equation (7) is required.

The evaluation score of the edge is thus obtained by summing the volume change V(X), the area change S(X), the contour change C(X), and the virtual surface height change H(X).

The degree of importance of each edge is thus determined according to the evaluation score. If one edge has a smaller evaluation score in the entire model, the influence of the removal of that edge on the entire shape model is considered to be relatively small. If the removal of edges having small evaluation scores is iterated until a desired number of surfaces (the number of polygons) is reached, a shape model having a desired level of detail results.

When one edge is removed, the configuration of the surfaces surrounding the removed edge changes. The length of the edge relating to the changed surface and the area of the change surface are re-calculated. Only the affected area, rather than the entire area, is thus calculated. When the evaluation score of each edge is calculated, the heap is used to find an edge having a minimum score. Since the heap is known as a data structure in the field of computer software algorithm, its discussion is omitted. With the heap technique employed, the data sorting shown in FIG. 1 (heap sort) is performed to the edges.

The edges having minimum values (edge evaluation scores) are thus removed, and final shape data is thus output.

FIG. 12 through FIG. 17 show the results of the approximation of the shape data, particularly, of edge reduction, in accordance with the embodiment of the present invention.

Figure 12:
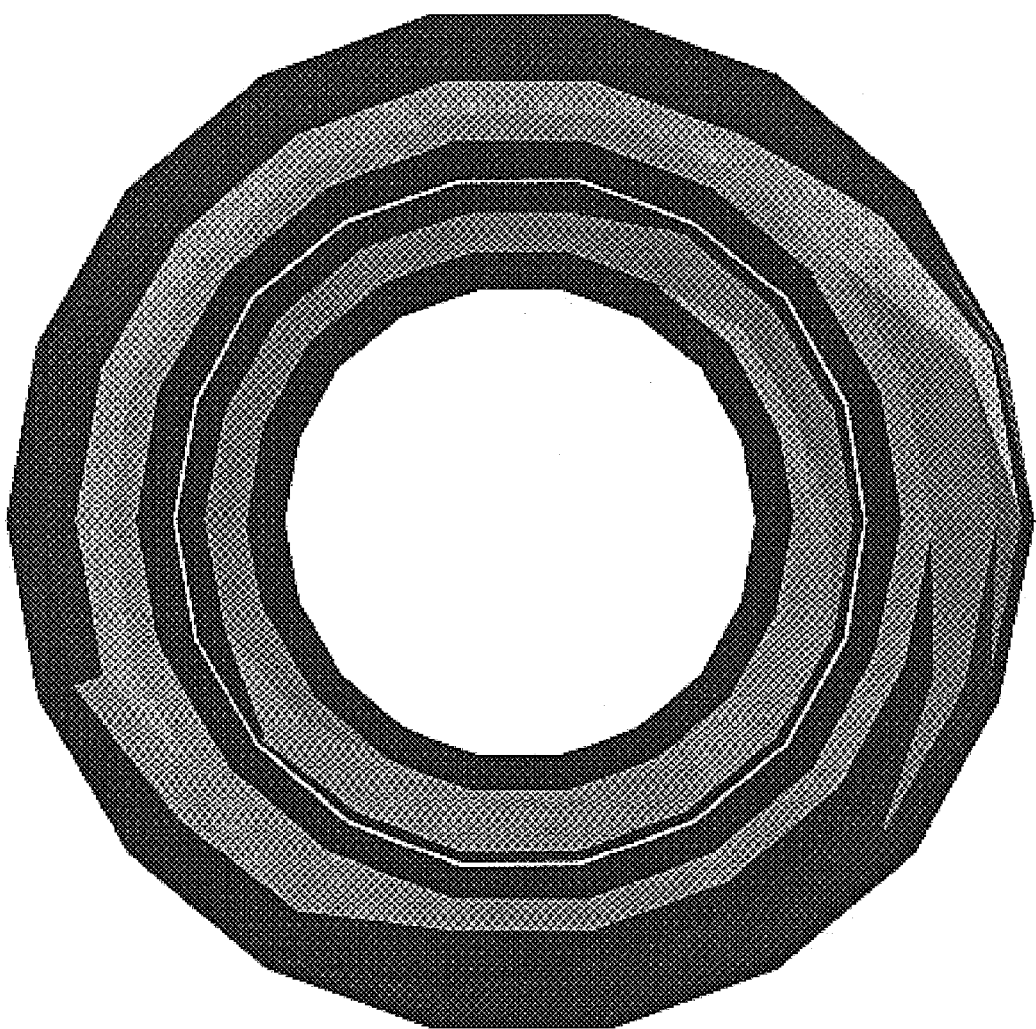
FIG. 12 shows a flat-shaded model of an original shape data.
Figure 13:
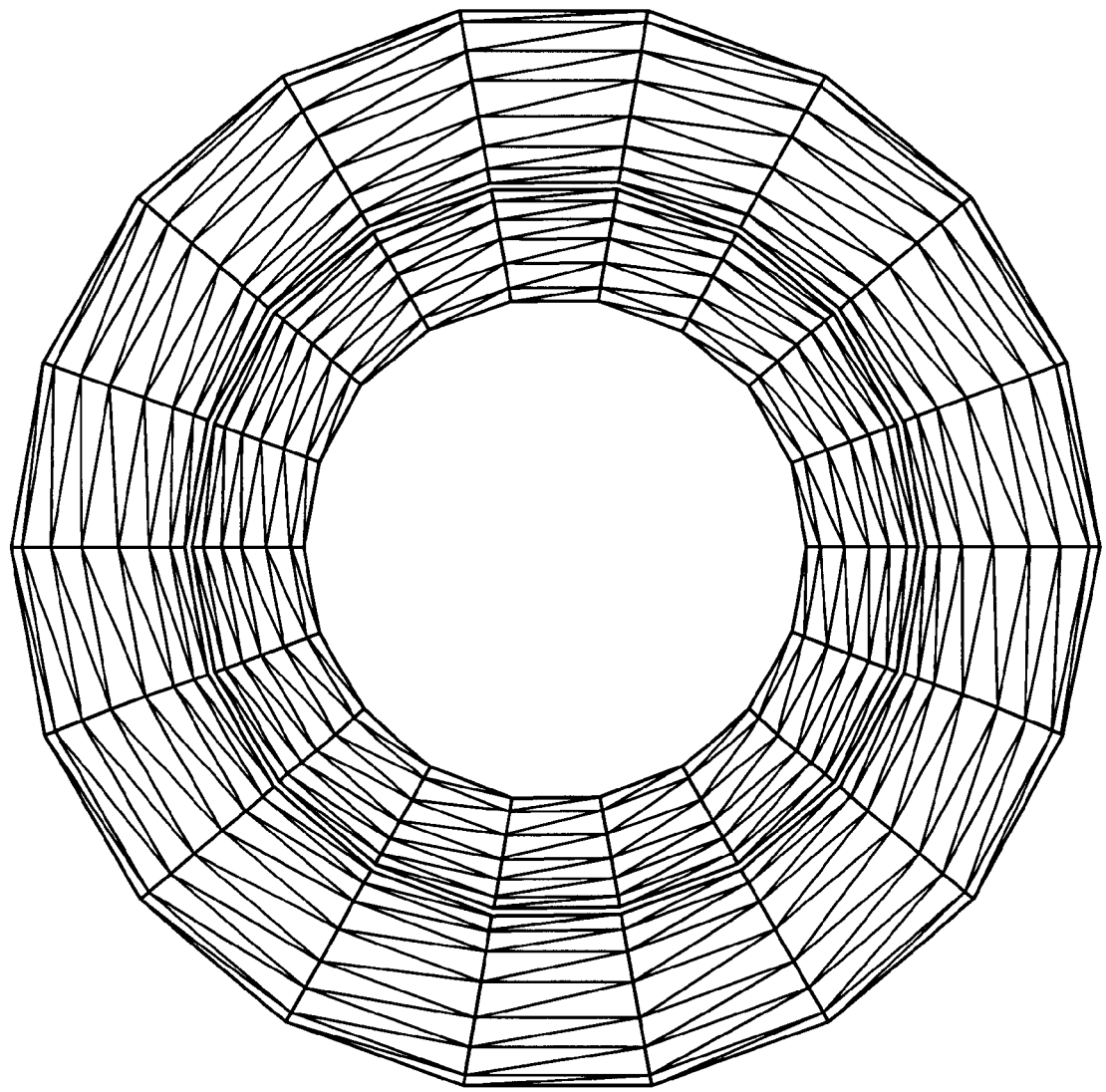
FIG. 13 shows a wire-frame model of an original shape data.
Figure 14:
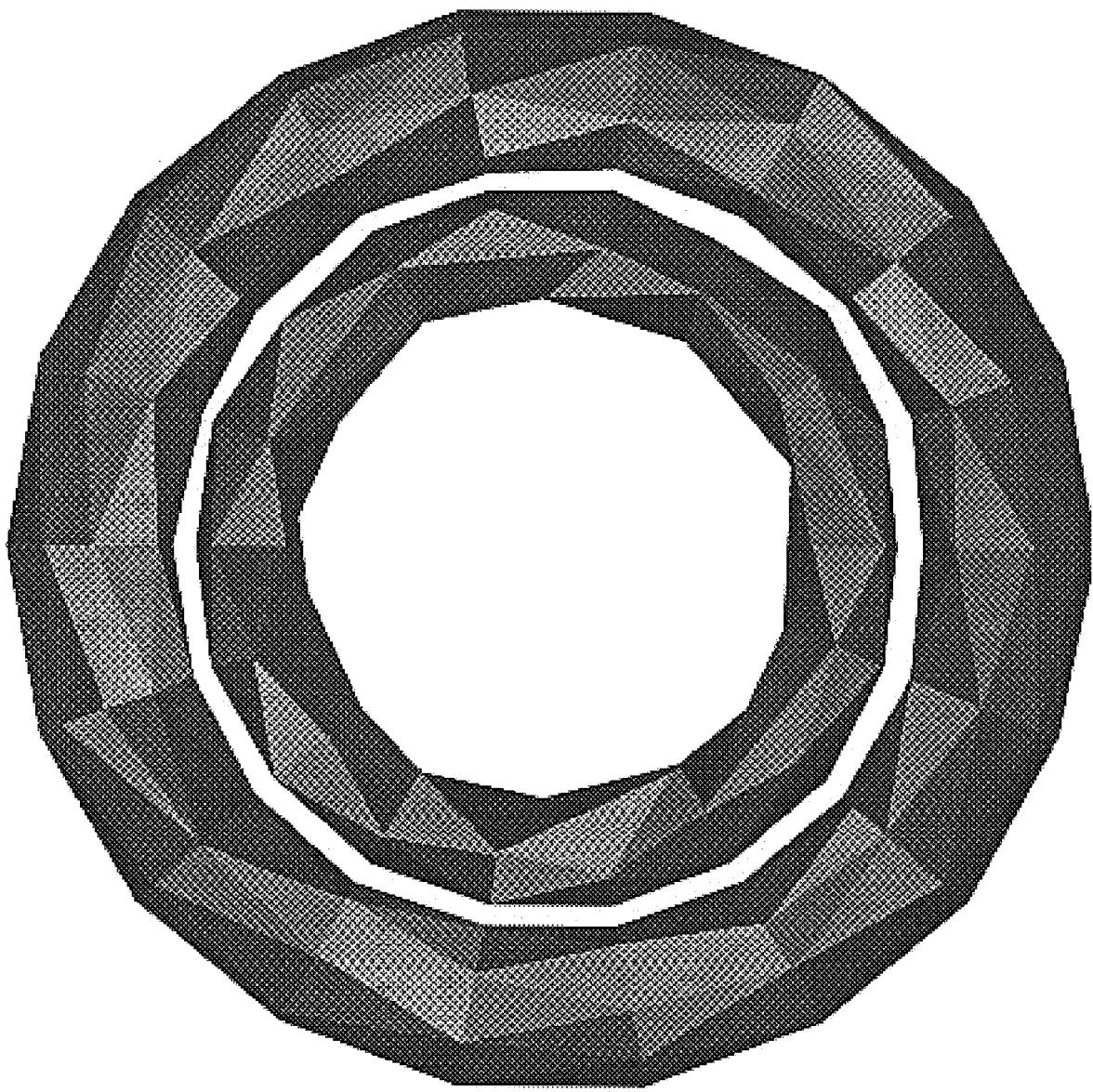
FIG. 14 shows a flat-shaded model that is reduced in the amount of data with no consideration given to the virtual surface.
Figure 15:
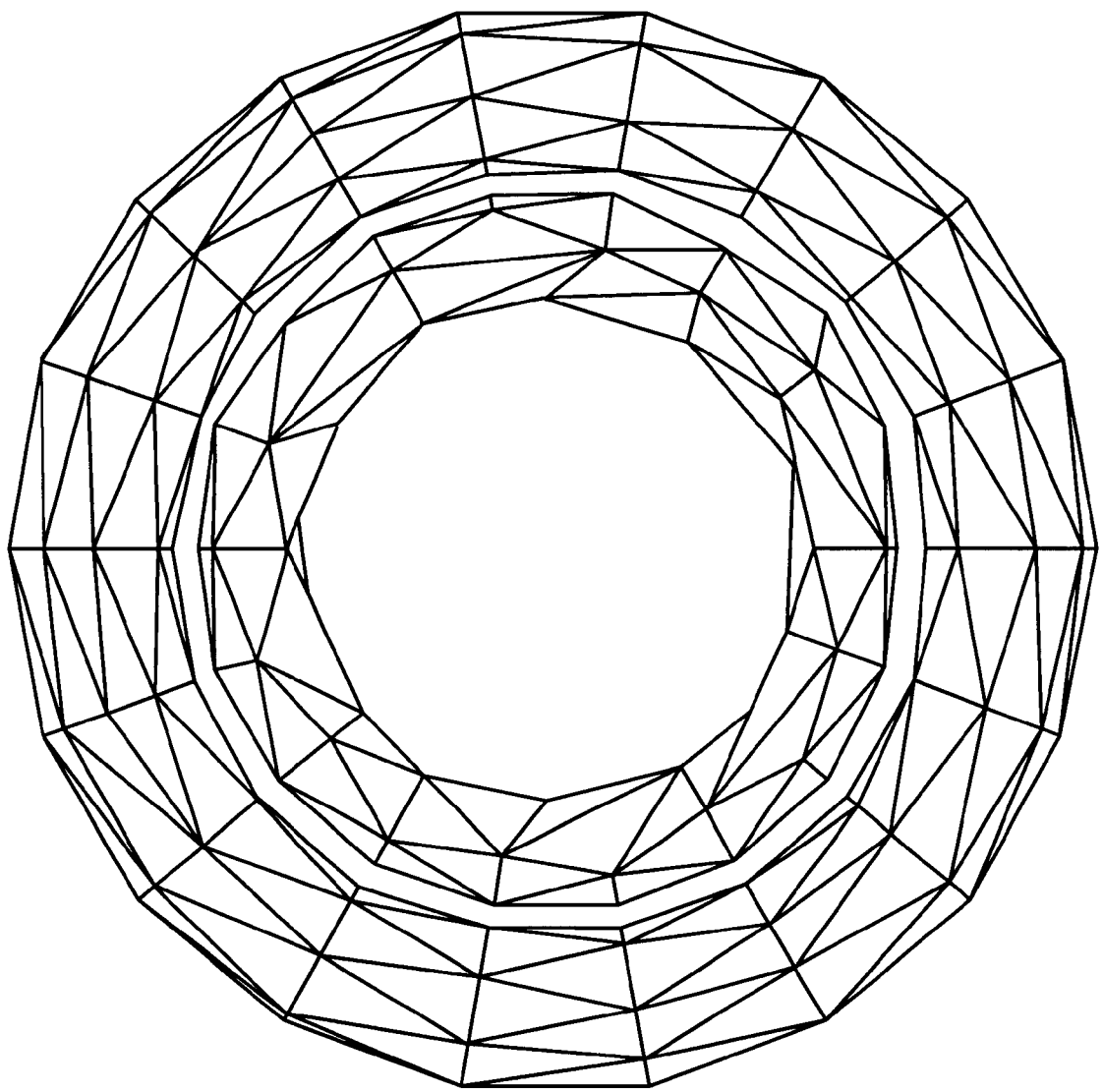
FIG. 15 shows a wire-frame model that is reduced in the amount of data with no consideration give to the virtual surface.
Figure 16:
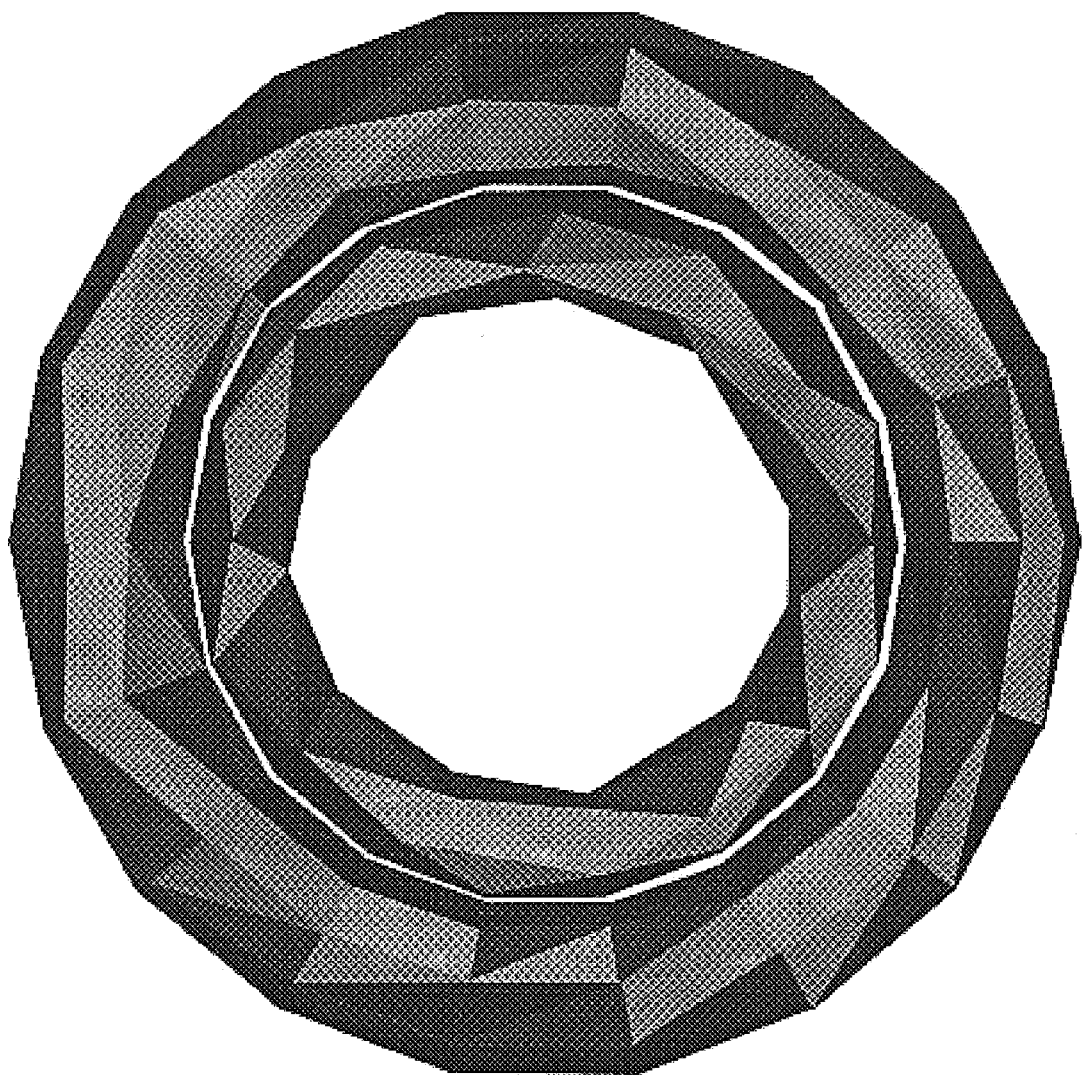
FIG. 16 shows a flat-shaded model that is reduced in the amount of data with the virtual surface considered.
Figure 17:
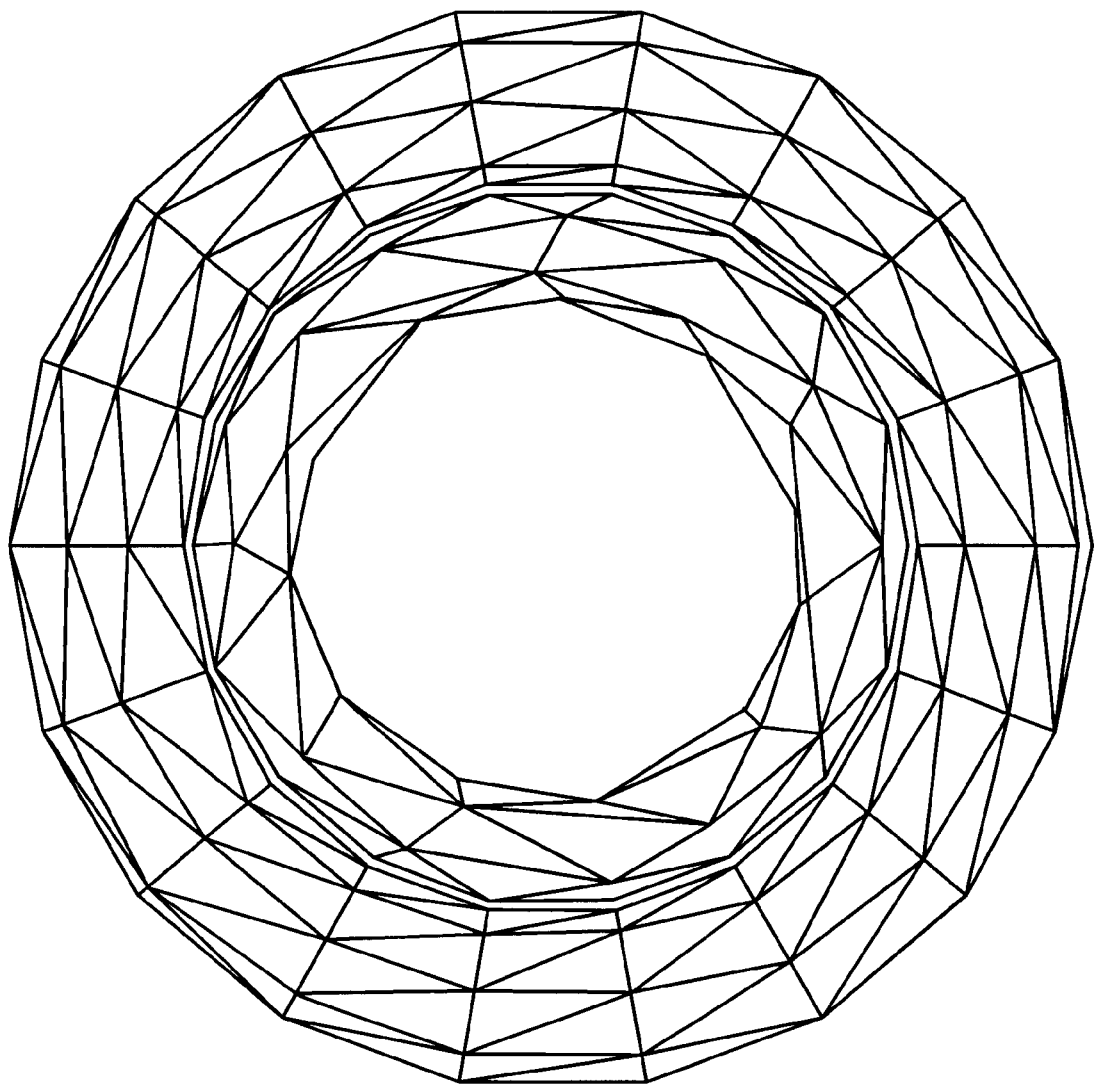
FIG. 17 shows a wire-frame model that is reduced in the amount of data with the virtual surface considered.

FIG. 12 and FIG. 13 show objects of original shape data, the amount of data of which is to be reduced. FIG. 12 shows a flat-shaded model, and FIG. 13 shows a wire-frame model. In these models, two concentric rings are adjacent to each other with a predetermined spacing therebetween. FIG. 14 and FIG. 15 show the results of data approximation in which, as in the conventional art, the virtual surface and the virtual edge are not created with no consideration given to the change in the height of the virtual surface in the adjacent region. FIG. 14 shows a flat-shaded model, and FIG. 15 shows a wire-frame model. Referring to FIG. 14 and FIG. 15, the number of surfaces is reduced to 36% of that of the originals, with the spacing between the two rings widened. In contrast, FIG. 16 and FIG. 17 show the results of the edge reduction in which the present embodiment of the invention is implemented. In accordance with the present embodiment, the spacing between the two rings is designated as the adjacent region, and the virtual surfaces and the virtual edges are created, and the change in the height of the virtual surface is taken into account in the edge reduction. FIG. 16 shows a flat-shaded model, and FIG. 17 shows a wire-frame model. Referring to FIG. 16 and FIG. 17, the spacing between the two rings is not widened, though the number of polygons is reduced to the same level of the amount of data shown in FIG. 14 and FIG. 15. In other words, in accordance with the present embodiment, the amount of data is reduced while the adjacency relationship in the adjacent region of the shape model is maintained.

Figure 18:
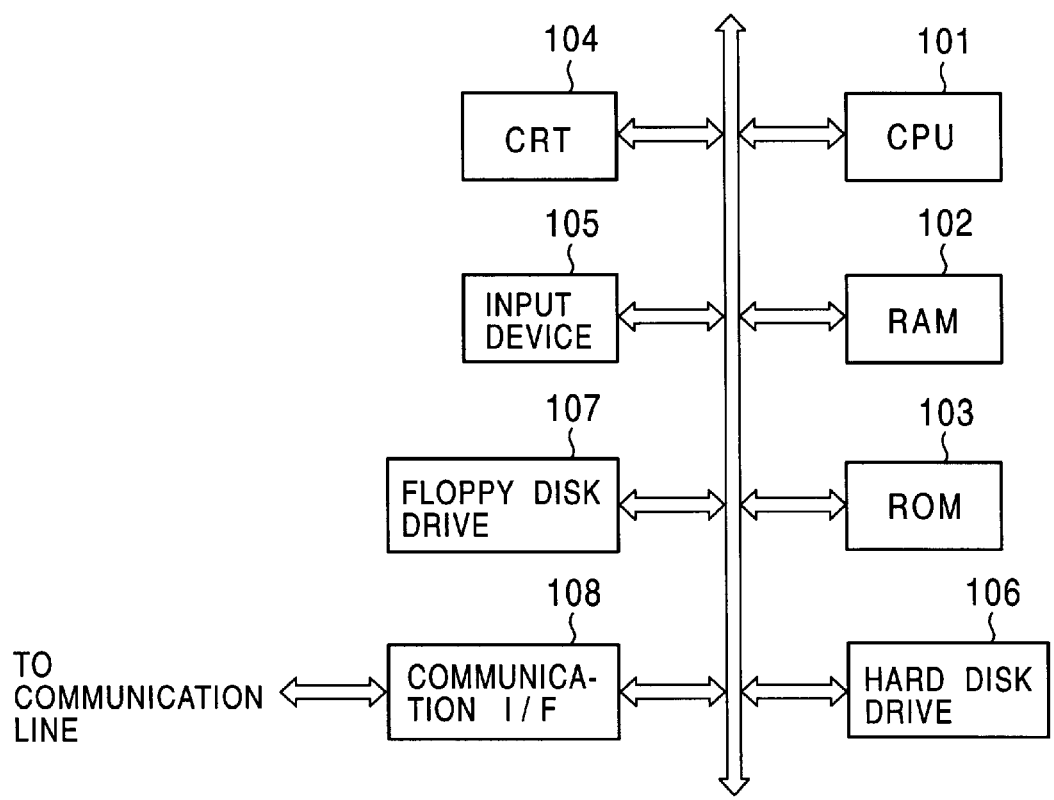
FIG. 18 is a block diagram of a display apparatus in which the present invention is implemented.

FIG. 18 shows a graphics display apparatus in which the present embodiment is implemented. Referring to FIG. 18, CPU (Central Processing Unit) 101 is employed to perform processings for rendering, particularly, to perform shape approximation control in which the adjacency relationship between the adjacent components is maintained. Connected to CPU 101 via a bus line are RAM (Random Access Memory) 102 for temporary storage, and ROM (Read Only Memory) 103 that stores beforehand programs and data required to execute the shape approximation process. Connected to the bus line are a CRT (Cathode Ray Tube) 104 for displaying an image, an input device 105 such as a keyboard or a mouse, a hard disk drive 106 as a large storage medium, and a floppy disk drive 107 for recording data onto and reproducing data from a floppy disk as an interchangeable recording medium. The program for executing the shape approximation process may be stored in an electronic memory such as RAM 102 or other storage medium such as the hard disk drive 106. The program for executing the shape approximation process may be received via a communication interface I/F 108 from a medium such as a communication line, is stored in RAM 102 or the hard disk drive 106, and is then executed by CPU 101.

As discussed above, the shape approximation process is carried out while the adjacency relationship between the adjacent components is maintained. Hierarchical approximation models thus obtained are stored in a storage device such as RAM 102. The viewer switches these models, as necessary, according to the apparent size, speed, and location of the model on screen and the point of interest to the viewer in order to display the models on the CRT or other display device. Available as the storage device is an electronic memory such as RAM 102, or a medium such as the hard disk drive 106. The storage device may be selected from these at the user's request. The models are beforehand approximated before use. Alternatively, the models are approximated on a real-time basis during rendering, and the approximate model is then rendered.

In accordance with the embodiment of the present invention, the amount of data of the shape model is reduced to a level the user desires while the adjacent region, engagement region, and the feature of the model are maintained.

With the present invention implemented, the image is rendered at a high speed and at a high image quality in the computer graphics, while the engagement relationship and the adjacency relationship between a plurality of components are maintained on screen. The number of models in use is limited because of the limitation of the rendering time in the conventional art. In accordance with the present invention, the number of models rendered is increased, while the image quality is maintained. The present invention finds widespread applications in computer games using computer graphics, VR (Virtual Reality), and design.

The present invention is not limited to the above embodiments. The evaluation function F(X) is the sum of the volume change V(X), the area change S(X), the contour area change C(X), and the height change in the adjacent region H(X) in the above discussion. Alternatively, the evaluation function F(X) may include only one change (rate of change), or the sum of two or more changes (rates of change) in any combination.

As the edge evaluation equation, the volume change V(X) only may be used, the area change S(X) only may be used, the contour area change C(X) only may be used, or the virtual surface height change (rate of change) H(X) only may be used. Alternatively, the sum of the volume change V(X) and the area change S(X) may be used, the sum of the volume change V(X), the area change S(X) and the contour area change C(X) may be used, the sum of the volume change V(X) and the contour area change C(X) may be used, the sum of the volume change V(X) and the virtual surface height change H(X) may be used, the sum of the volume change V(X), the contour area change C(X), and the virtual surface height change H(X) may be used, the sum of the volume change V(X), the area change S(X), and the virtual surface height change H(X) may be used, the sum of the area change S(X) and the contour area change C(X) may be used, the sum of the area change S(X) and the virtual surface height change H(X) may be used, or the sum of the contour area change C(X) and the virtual surface height change H(X) may be used.

As discussed above, in accordance with the present invention, the adjacent region where the plurality of components are adjacent to each other in the shape data is designated, the evaluation is performed in accordance with the degree of importance of the designated adjacent region, and the shape data is approximated in accordance with the evaluation score obtained in the evaluation step. The shape data is thus approximated at a desired level of detail. The amount of data of the shape data is thus reduced while adjacent region and engagement region in the shape model used in the computer graphics are maintained. In accordance with the present invention, the amount of data is thus reduced while the adjacent region and engagement region in the shape model composed of a ad plurality of components are maintained. The general configuration and feature of the shape data are also maintained. The use of the shape data, the amount of data of which is reduced in accordance with the present invention, permits high-speed rendering and high-quality image in the computer graphics.

What is claimed is:

1. A method of approximating shape data at a desired level of detail to be approximate data, the approximation method comprising the steps of:

designating an adjacent region between at least first and second adjacent components in the shape data;

calculating an evaluation score in accordance with a degree of deformation of the adjacent region resulting from an approximation; and approximating the shape data in accordance with the evaluation score to create the approximate data wherein a positional relationship between the at least first and second adjacent components is maintained.

2. The approximation method according to claim 1, further comprising the step of selecting an evaluation edge of interest for evaluation from the shape data, wherein the evaluating step calculates the evaluation score in accordance with the degree of deformation of the adjacent region when the evaluation edge is removed from the shape data and, wherein the approximating step approximates the shape data by determining, in accordance with the evaluation score, whether to remove the evaluation edge.

3. An approximation method according to claim 1, wherein the evaluating step places a virtual edge between apexes of adjacent components, and calculates the evaluation score in accordance with the degree of deformation of a virtual surface containing the virtual edge.

4. An approximation method according to claim 3, wherein the evaluating step calculates the evaluation score in accordance with a quantity of deformation by which the shape of the adjacent region deforms when the edge of the shape data or the virtual edge is removed.

5. An approximation method according to claim 3, wherein the evaluating step calculates the evaluation score in accordance with a change in height of the virtual surface including a new apex that is determined when the edge of the shape data or the virtual edge is removed.

6. An approximation method according the claim 5, wherein the evaluating step calculates the change in the height of the virtual surface including the new apex that is determined when the evaluation edge is removed, based on a rate of change between the height of the virtual surface before and after the removal of the evaluation edge.

7. An approximation method according to claim 5, wherein the evaluating step calculates the change in the height of the virtual surface including the new apex that is determined when the evaluation edge is removed, based on absolute values of the heights of the virtual surface before and after the evaluation edge is removed.

8. An approximation method according to claim 5, wherein the evaluating step calculates the evaluation score, based on the sum of changes in the heights of a plurality of virtual surfaces including the new apex that is determined when the evaluation edge is removed.

9. An approximation method according to claim 1, wherein the evaluating step calculates the evaluation score based on a quantity of change in the shape of the adjacent region when the edge of the shape data is removed.

10. An approximation method according to claim 9, wherein the evaluating step calculates the evaluation score, based on a change in spacing of the adjacent region when the edge of the shape data is removed.

11. A method for approximating shape data at a desired level of detail to be approximate data, the approximation method comprising the steps of:

placing a virtual edge between apexes of an adjacent region between a plurality of adjacent components within the shape data;

selecting an evaluation edge of interest for evaluation from edges constituting the shape data and the virtual edge;

calculating an evaluation score in accordance with a degree of importance of an evaluation edge in response to a removal of the evaluation edge; and approximating the shape data in accordance with the evaluation score such that a positional relationship between said plurality of components in said shape data is maintained in said approximate data.

12. An approximation method according to claim 11, wherein the selecting step selects the evaluation edge from both the edges constituting the shape data and the virtual edge.

13. An approximation method according to claim 11, wherein the selecting step selects no virtual edge as an evaluation edge.

14. An approximation method according to claim 11, wherein the evaluating step calculates the evaluation score, based on a change in volume of a shape model when the evaluation edge is removed.

15. An approximation method according to claim 11, wherein the evaluating step calculates the evaluation score, based on a change in area of a shape model when the evaluation edge is removed.

16. An approximation method according to claim 11, wherein the evaluating step calculates the evaluation score, based on a change in the area of a contour constituted by an edge adjacent to the evaluation edge when the evaluation edge is removed.

17. An approximation method according the claim 11, wherein the forming step forms a virtual surface between the apexes of the adjacent region using the virtual edge formed between the apexes of the adjacent region, and wherein the evaluating step calculates the evaluation score based on a change in height of a virtual surface when the edge constituting the virtual surface or the edge adjacent to the virtual surface is removed.

18. An approximation method according to claim 11, where the evaluating step calculates the evaluation score by summing at least two changes out of a change in the volume of a shape model, a change in the area of the shape model, a change in the area of a contour, and a change in the height of a virtual surface, when the evaluation edge is removed.

19. An information processing apparatus for approximating shape data at a desired level of detail to be approximate data, the apparatus comprising:

designating means for designating an adjacent region between at least first and second adjacent components in the shape data;

evaluating means for calculating an evaluation score in accordance with a degree of deformation of the adjacent region resulting from an approximation; and approximating means for approximating the shape data in accordance with the evaluation score provided by the evaluating means to create the approximate data wherein a positional relationship between the at least first and second adjacent components is maintained.

20. An information processing apparatus according to claim 19, further comprising selecting means for selecting an evaluation edge of interest for evaluation from the shape data, wherein the evaluating means calculates the evaluation score in accordance with the degree of deformation of the adjacent region when the evaluation edge is removed from the shape data and, wherein the approximating means approximates the shape data by determining, in accordance with the evaluation score, whether to remove the evaluation edge.

21. An information processing apparatus according to claim 19, wherein the evaluating means places a virtual edge between apexes of adjacent components, and calculates the evaluation score in accordance with the degree of deformation of a virtual surface containing the virtual edge.

22. An information processing apparatus according to claim 21, wherein the evaluating means calculates the evaluation score in accordance with a quantity of deformation by which the shape of the adjacent region deforms when the edge of the shape data or the virtual edge is removed.

23. An information processing apparatus according to claim 21, wherein the evaluating means calculates the evaluation score in accordance with a change in the height of the virtual surface including a new apex that is determined when the edge of the shape data or the virtual edge is removed.

24. An information processing apparatus according to claim 23, wherein the evaluating means calculates the change in the height of the virtual surface including the new apex that is determined when the evaluation edge is removed, based on a rate of change between a height of the virtual surface before and after the removal of the evaluation edge.

25. An information processing apparatus according to claim 23, wherein the evaluating means calculates the change in the height of the virtual surface including the new apex that is determined when the evaluation edge is removed, based on absolute values of heights of the virtual surface before and after the removal of the evaluation edge.

26. An information processing apparatus according to claim 23, wherein the evaluating means calculates the evaluation score, based on the sum of changes in the heights of a plurality of virtual surfaces including the new apex that is determined when the evaluation edge is removed.

27. An information processing apparatus according to claim 19, wherein the evaluating means calculates the evaluation score, based on a quantity of change in the shape of the adjacent region when the edge of the shape data is removed.

28. An information processing apparatus according to claim 27, wherein the evaluating means calculates the evaluation score, based on a change in spacing of the adjacent region when the edge of the shape data is removed.

29. An information processing apparatus for approximating shape data at a desired level of detail to be approximate data, the apparatus comprising:

forming means for placing a virtual edge between apexes of an adjacent region where between a plurality of components are adjacent to each other in the shape data;

selecting means for selecting an evaluation edge of interest for evaluation from edges constituting the shape data and the virtual edge;

evaluating means for calculating an evaluation score in accordance with a degree of importance of the evaluation edge in response to a removal of the evaluation edge; and approximating means for approximating the shape data in accordance with the evaluation score wherein a positional relationship between the plurality of components in the shape data is maintained in the approximate data.

30. An information processing apparatus according to claim 29, wherein the selecting means selects the evaluation edge from both the edge constituting the shape data and the virtual edge.

31. An information processing apparatus according to claim 29, wherein the selecting means selects no virtual edge as an evaluation edge.

32. An information processing apparatus according to claim 29, wherein the evaluating means calculates the evaluation score, based on a change in volume of a shape model when the evaluation edge is removed.

33. An information processing apparatus according to claim 29, wherein the evaluating means calculates the evaluation score, based on a change in area of a shape model when the evaluation edge is removed.

34. An information processing apparatus according to claim 29, wherein the evaluating means calculates the evaluation score, based on a change in areas of a contour constituted by edges adjacent to the evaluation edge when the evaluation edge is removed.

35. An information processing apparatus according to claim 29, wherein the forming means forms a virtual surface between the apexes of the adjacent region using the virtual edge formed between the apexes of the adjacent region, and wherein the evaluating means calculates the evaluation score, based on a change in height of the virtual surface when the edge constituting the virtual surface or the edge adjacent to the virtual surface is removed.

36. An information processing apparatus according to claim 29, where the evaluating means calculates the evaluation score by summing at least two changes out of a change in the volume of a shape model, a change in the area of the shape model, a change in the area of a contour, and a change in the height of a virtual surface, when the evaluation edge is removed.

37. An information processing apparatus for approximating shape data at a desired level of detail to be approximate data, the apparatus comprising:

a storage unit for storing a program including process steps; and a control circuit for executing the program in accordance with the process steps, wherein the program comprises the steps of:
designating an adjacent region between at least first and second adjacent components in the shape data;
calculating an evaluation score in accordance with a degree of deformation of the adjacent region resulting from an approximation; and
approximating the shape data in accordance with the evaluation score provided by the calculating means to create the approximate data wherein a positional relationship between the at least first and second components in the shape data is maintained in said approximate data.

38. An information processing apparatus for approximating shape data at a desired level of detail to be approximate data, the apparatus comprising:

a storage unit for storing a program including process steps; and a control circuit for executing the program in accordance with the process steps, wherein the program comprises the steps of:
placing a virtual edge between apexes of an adjacent region between a plurality of adjacent components within the shape data;
selecting an evaluation edge of interest for evaluation from an edge constituting the shape data and the virtual edge;
calculating an evaluation score in accordance with a degree of importance of the evaluation edge in response to a removal of the evaluation edge; and
approximating the shape data in accordance with the evaluation score such that a positional relationship between said plurality of components in said shape data is maintained in said approximate data.

39. A storage medium having a computer program stored thereon, the computer program adapted to be read from the storage medium and executed by an information processing apparatus, the program comprising the steps of:

designating an adjacent region where a plurality of components are adjacent to each other in the shape data;
calculating an evaluation score in accordance with a degree of deformation of the adjacent region resulting from an approximation; and
approximating the shape data in accordance with the evaluation score to create the approximate data such that a positional relationship between said plurality of components in said shape data is maintained in said approximate data.

40. A storage medium having a computer program stored thereon, the computer program adapted to be read from the storage medium and executed by an information processing apparatus, the program comprising the steps of:

placing a virtual edge between apexes of an adjacent region between a plurality of adjacent components within the shape data;
selecting an evaluation edge of interest for evaluation from an edge constituting the shape data and the virtual edge;
calculating an evaluation score in accordance with a degree of importance of the evaluation edge in response to a removal of the evaluation edge; and
approximating the shape data in accordance with the evaluation score such that a positional relationship between said plurality of components in said shape data is maintained in said approximate data.

41. A computer readable storage medium having approximate data stored thereon, where the approximate data represents shape data that has been approximated to a desired level of detail, wherein the approximate data is processed in accordance with "the" and replace it with "a" process that comprises the steps of:

designating an adjacent region where a plurality of components are adjacent to each other in the shape data;
calculating an evaluation in accordance with a degree of deformation of the adjacent region resulting from an approximation; and
approximating the shape data in accordance with the evaluation score provided through the calculating step to create the approximate data such that a positional relationship between said plurality of components in said shape data is maintained in said approximate data.

42. A computer readable storage medium having approximate data stored thereon, where the approximate data represents shape data that has been approximated to a desired level of detail, wherein the approximate data is processed in accordance with a process that comprises the steps of:

placing a virtual edge between apexes of an adjacent region between a plurality of adjacent components within the shape data;
selecting an evaluation edge of interest for evaluation from an edge constituting the shape data and the virtual edge;
calculating an evaluation score in accordance with a degree of importance of the evaluation edge in response to a removal of the evaluation edge; and
approximating the shape data in accordance with the evaluation score such that a positional relationship between said plurality of components in said shape data is maintained in said approximate data.

43. A storage medium having a computer program stored thereon, the computer program adapted to be executed by an information processing apparatus in order to create approximate data by approximating shape data at a desired level of detail, the program comprising the steps of:

designating an adjacent region where a plurality of components are adjacent to each other in the shape data;

calculating an evaluation score in accordance with a degree of deformation of the adjacent region resulting from an approximation; and approximating the shape data in accordance with the evaluation score to create the approximate data such that a positional relationship between said plurality of components in said shape data is maintained in said approximate data.

44. A storage medium having a computer program stored thereon, the computer program adapted to be executed by an information processing apparatus in order to create approximate data by approximating shape data at a desired level of detail, the program comprising the steps of:

placing a virtual edge between apexes of an adjacent region between a plurality of adjacent components within the shape data;

selecting an evaluation edge of interest for evaluation from an edge constituting the shape data and the virtual edge;

calculating an evaluation score in accordance with a degree of importance of the evaluation edge in response to a removal of the evaluation edge; and approximating the shape data in accordance with the evaluation score such that a positional relationship between said plurality of components in said shape data is maintained in said approximate data.

45. An image processing method for reducing image data to approximate image data, the method comprising the steps of:

designating a region between a plurality of image components within the image data;

creating a virtual surface including a virtual edge within said designated region by connecting vertices of said components to each other across said region;

reducing said image data to approximate image data in a manner such that the shape of at least one of the virtual surface and the virtual edge is maintained so that the positional relationship between the image components is maintained in the approximate data.

46. The image processing method according to claim 45, further comprising the step of selecting an evaluation edge of interest for evaluation from the image data, wherein the reducing step calculates an evaluation score in accordance with a degree of deformation of the adjacent region when the evaluation edge is removed from the image data and, wherein the reducing step approximates the image data by determining, in accordance with the evaluation score, whether to remove the evaluation edge.

47. An image processing method according to claim 45, wherein the reducing step places a virtual edge between apexes of adjacent components, and calculates an evaluation score in accordance with the degree of deformation of a virtual surface containing the virtual edge.

48. An image processing method according to claim 47, wherein the reducing step calculates an evaluation score in accordance with a quantity of deformation by which the shape of the adjacent region deforms when the edge of the shape data or the virtual edge is removed.

49. An image processing method according to claim 47, wherein the reducing step calculates an evaluation score in accordance with a change in height of the virtual surface including a new apex that is determined when the edge of the shape data or the virtual edge is removed.

50. An image processing method according to claim 49, wherein the reducing step calculates the change in the height of the virtual surface including the new apex that is determined when the evaluation edge is removed, based on a rate of change between the heights of the virtual surface before and after the removal of the evaluation edge.

51. An image processing method according to claim 49, wherein the reducing step calculates the change in the height of the virtual surface including the new apex that is determined when the evaluation edge is removed, based on absolute values of the heights of the virtual surface before and after the evaluation edge is removed.

52. An image processing method according to claim 49, wherein the reducing step calculates the evaluation score, based on the sum of changes in the heights of a plurality of virtual surfaces including the new apex that is determined when the evaluation edge is removed.

53. An image processing method according to claim 45, wherein the reducing step calculates the evaluation score based on a quantity of change in the shape of the adjacent region when the edge of the shape data is removed.

54. An image processing method according to claim 53, wherein the reducing step calculates the evaluation score, based on a change in spacing of the adjacent region when the edge of the shape data is removed.

* * * * *